(12) United States Patent
Erickson et al.

(10) Patent No.: US 12,145,121 B1
(45) Date of Patent: Nov. 19, 2024

(54) FLOW CONTROL MECHANISM FOR HIGH-THROUGHPUT OLIGONUCLEOTIDE SYNTHESIS

(71) Applicant: SIERRA BIOSYSTEMS, INC., Sonora, CA (US)

(72) Inventors: Bruce Erickson, Sonora, CA (US); Marshall Henry, Sonora, CA (US)

( * ) Notice: Subject to any disclaimer, the term of this patent is extended or adjusted under 35 U.S.C. 154(b) by 0 days.

(21) Appl. No.: 18/381,462

(22) Filed: Oct. 18, 2023

(51) Int. Cl.
  *B01J 19/00* (2006.01)
(52) U.S. Cl.
  CPC .. *B01J 19/0046* (2013.01); *B01J 2219/00308* (2013.01); *B01J 2219/00337* (2013.01); *B01J 2219/00353* (2013.01); *B01J 2219/00418* (2013.01); *B01J 2219/00495* (2013.01); *B01J 2219/245* (2013.01)
(58) Field of Classification Search
  None
  See application file for complete search history.

(56) References Cited

U.S. PATENT DOCUMENTS

| | | | | |
|---|---|---|---|---|
| 5,714,127 A | * | 2/1998 | DeWitt | C07K 1/045 422/534 |
| 5,716,584 A | * | 2/1998 | Baker | B01L 3/50853 506/40 |
| 5,792,430 A | * | 8/1998 | Hamper | B01J 19/0046 422/138 |
| 2003/0202911 A1 | * | 10/2003 | Erden | B01J 3/04 422/130 |
| 2006/0191893 A1 | * | 8/2006 | Weinfield | B01D 61/18 219/428 |
| 2008/0286170 A1 | * | 11/2008 | Diamond | C40B 60/08 422/600 |
| 2012/0085415 A1 | * | 4/2012 | Bailey | B01L 3/5025 422/551 |

* cited by examiner

*Primary Examiner* — Brian R Gordon
(74) *Attorney, Agent, or Firm* — Sherrie M. Flynn; Aisha O. Otori; Coleman & Horowitt LLP

(57) ABSTRACT

An improved apparatus for oligonucleotide synthesis, that has four or more synthesis vessels, each synthesis vessel having a waste emitting end, a synthesis plate holding the four or more synthesis vessels, a drain block located below and coupled to the synthesis plate, a sealing device in contact with the synthesis plate and the drain block, one or more waste collection reservoirs located inside of the drain block, one or more equilibration holes, each equilibration hole penetrating the exterior of the drain block and the waste collection reservoir(s), one or more waste tubes connected to the waste collection reservoir(s), each waste tube comprising a waste valve. The sealing device may have one or more sealing blocks, and the equilibration holes may be located in the sealing blocks in lieu of in the drain block. Each equilibration hole may be coupled to a solenoid or flow control valve.

12 Claims, 18 Drawing Sheets

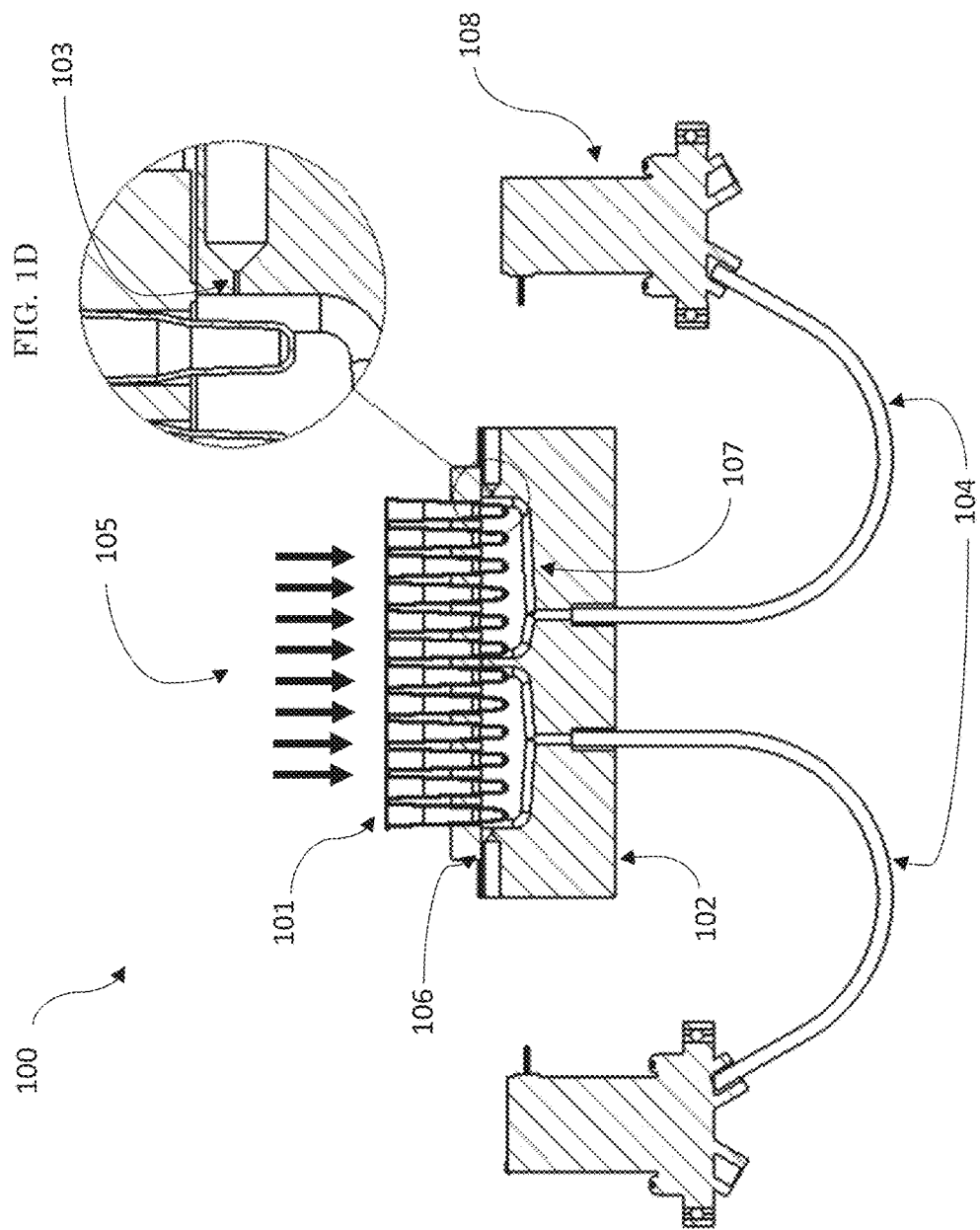

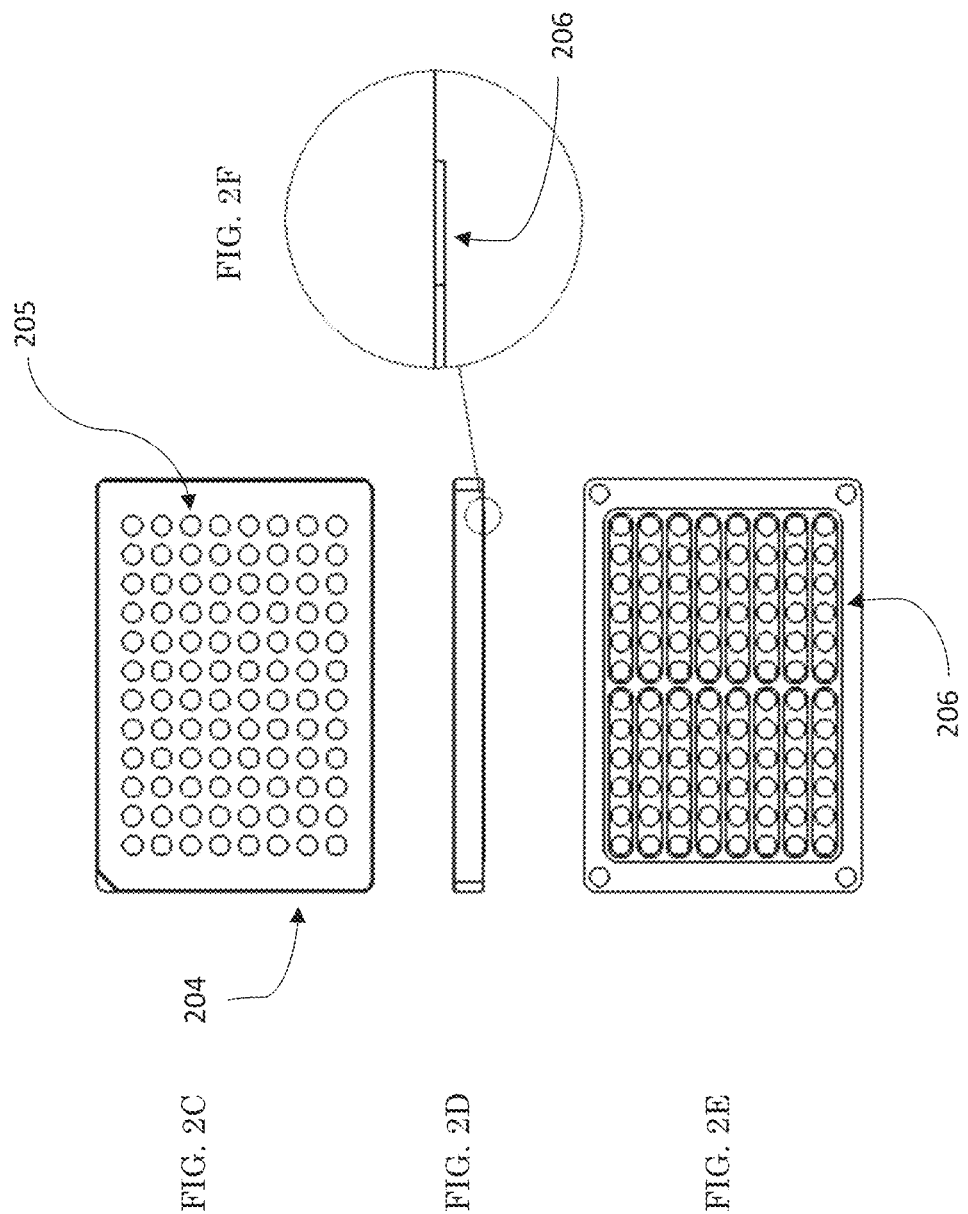

Section B-B

Section C-C

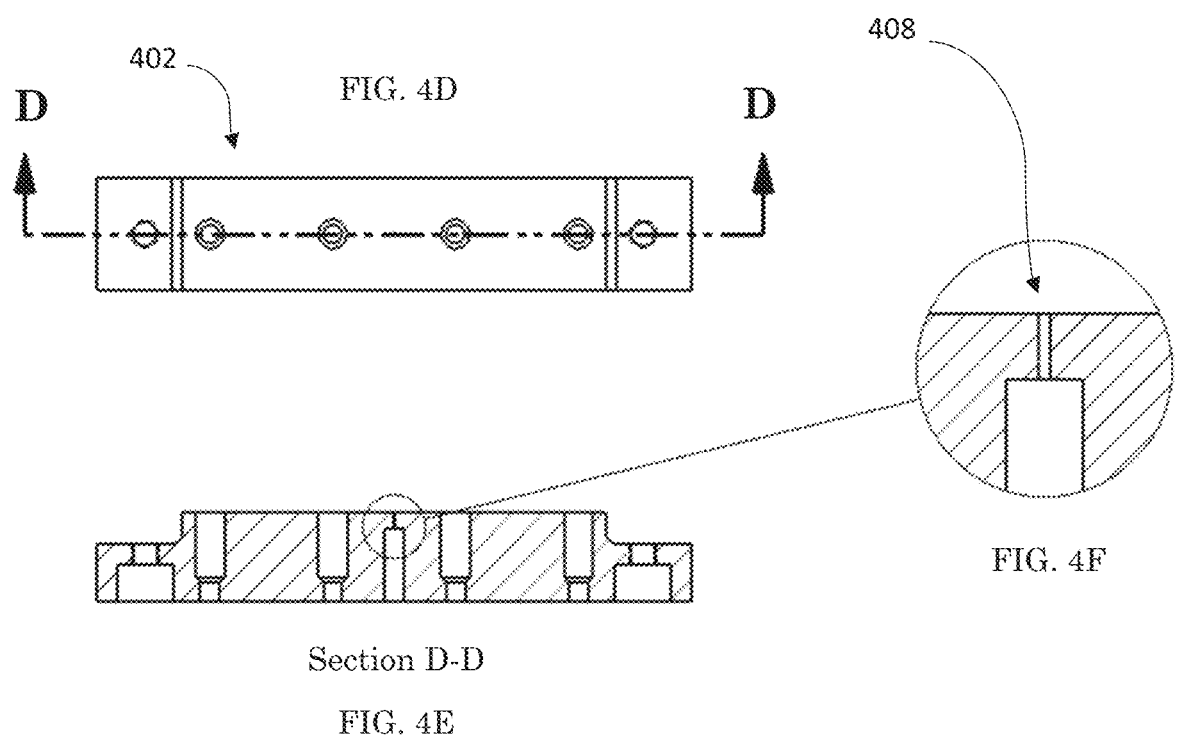

FLOW CONTROL MECHANISM FOR HIGH-THROUGHPUT OLIGONUCLEOTIDE SYNTHESIS

FIELD OF INVENTION

The disclosed subject matter is generally related to the field of biotechnology. More specifically, the disclosed subject matter is related to the de novo synthesis of DNA, RNA, synthons, and full genes-frequently generically referred to as oligonucleotide synthesis.

DISCUSSION OF THE BACKGROUND

Since the release of the seminal paper on tRNA synthesis in 1972 by H. G. Khorana et al., the field of gene synthesis has experienced steady growth. With its use in generating novel therapeutics and biomaterials, academic and industrial researchers frequently require more exogenous DNA sequences than a standard laboratory can produce.

To fill this need, automated oligonucleotide synthesis systems have been developed to generate oligonucleotides in hours, in quantities and varieties that a single laboratory technician would have needed weeks or months to complete. As the demand for synthetic oligonucleotides increases, these high-throughput systems must experience continual refinement to meet the needs of the marketplace.

The information described in this section is provided to offer the skilled artisan a context for the following disclosed subject matter and should not be considered as admitted prior art.

SUMMARY OF THE INVENTION

Devices, mechanisms, and design elements are disclosed herein that reduce reagent consumption and increase yield on an oligonucleotide synthesis apparatus. In an embodiment, a mechanism for this improvement lies in the invention of a machined block that can receive conventional microtiter plates, syringe bodies, tubules, or other vessels filled with the necessary elements to begin oligonucleotide synthesis and control the flow via equilibration ports or "equilibration" holes. These equilibration ports or holes can prevent premature drainage and facilitate gravitational flow. Various embodiments presented herein offer an end user processes for generating oligonucleotides using the above mechanism.

In an embodiment, the disclosed subject matter includes an apparatus used for oligonucleotide synthesis. The apparatus includes a machined block configured to receive a commercially-available microtiter plate, syringe bodies, tubules, columns, or other vessels filled with the necessary elements to begin oligonucleotide synthesis, necessary sealing elements for each, and machined or inserted equilibration ports.

BRIEF DESCRIPTION OF THE DRAWINGS

FIG. 1C shows a cross-sectional view of the EOS system of FIGS. 1A and 1B.

FIG. 1D shows a cross-sectional detail view of the exhaust or "equilibration" holes of the EOS system;

FIG. 2C is a top view of the sealing device of FIG. 2A.

FIG. 2D is a side view of the sealing device of FIG. 2A, showing extruded grooves.

FIG. 2E is a bottom view of the sealing device of FIG. 2A showing the extruded grooves.

FIG. 2F is an enlarged detail of the extruded grooves of FIG. 2D.

FIG. 4D is a top view of a sealing block according to an embodiment of the invention.

FIG. 4E is a cross-sectional view of the sealing block of FIG. 4D.

FIG. 4F is an enlarged view of the equilibration hole of FIG. 4E.

DETAILED DESCRIPTION OF THE PREFERRED EMBODIMENTS

Figure 1A:
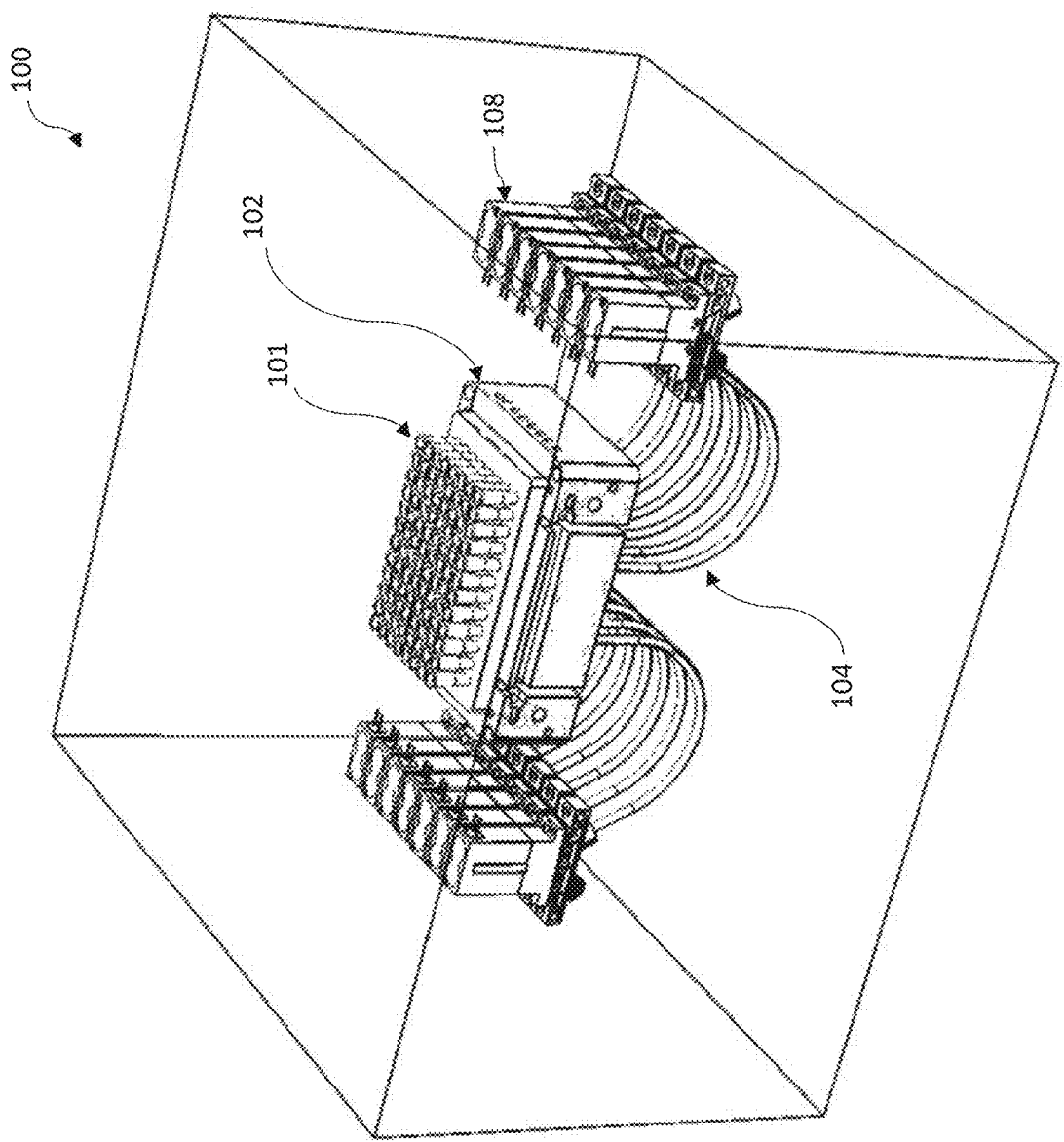
FIG. 1A shows a perspective view of an embodiment of an EOS system.
Figure 1B:
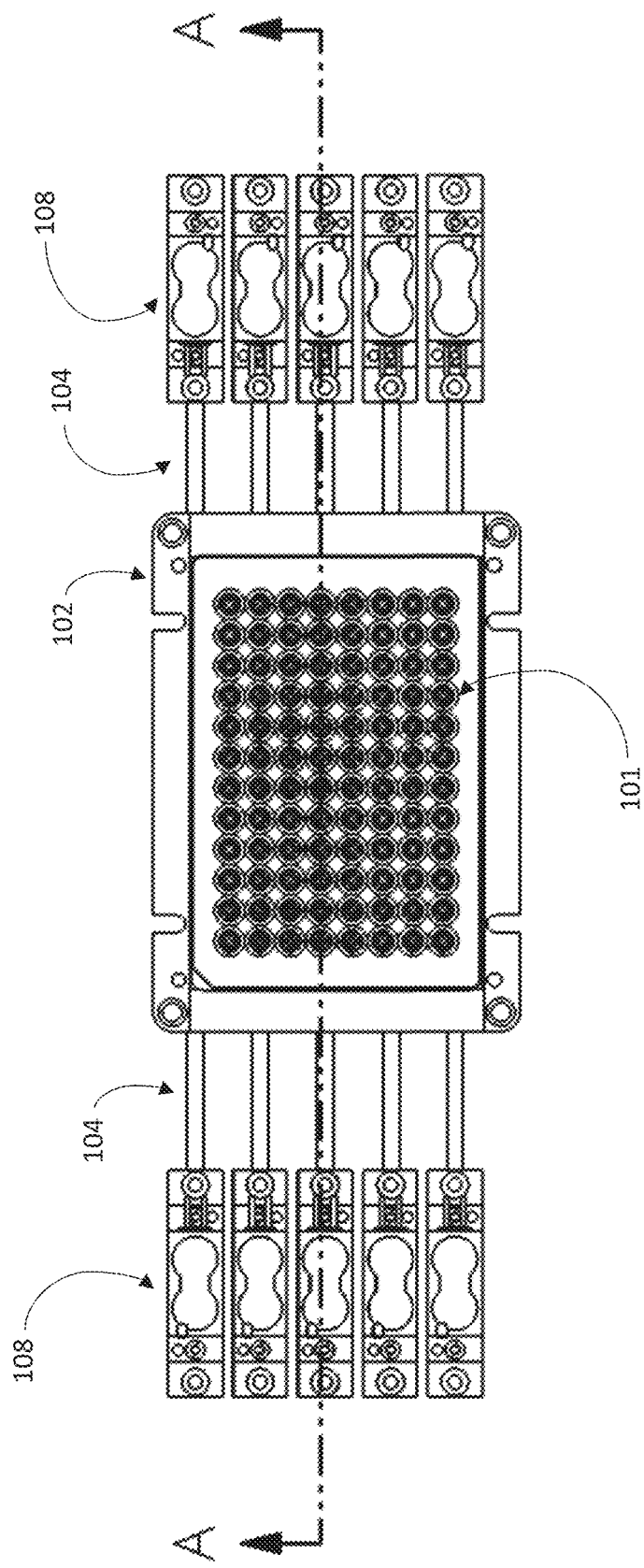
FIG. 1B shows a top view of the EOS system of FIG. 1A.
Figure 1E:
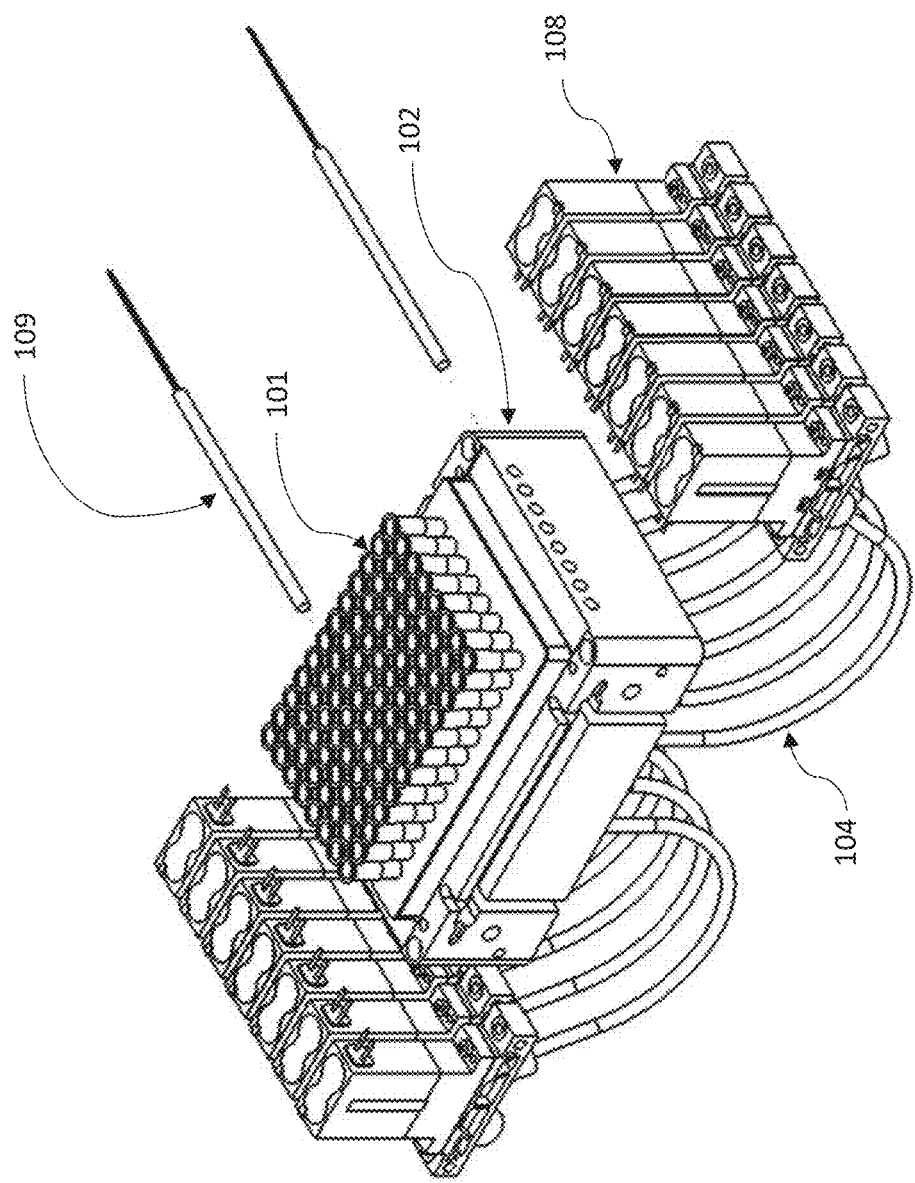
FIG. 1E shows a perspective, exploded view of the EOS system with two embedded heating elements, or insertion heaters.

A person of ordinary skill in the art will recognize that various dimensions and other units provided herein, including those dimensions and other units provided in the appended figures and diagrams, are given merely to provide a context in which the disclosed subject matter may be readily understood. However, the dimensions and other units are exemplary only and can be varied as needed. Therefore, the dimensions and other units should not be considered as being limiting; the skilled artisan, upon reading and understanding the disclosure provided herein, will recognize how to modify various ones of the dimensions and other units as needed for a given application.

When synthesizing oligonucleotides, the starting material for solid-phase oligonucleotide synthesis will be present in a synthesis vessel(s) and placed in a flow path where new chemicals can be introduced, allowed to react, and then removed so that new chemicals may enter the vessel. These reactions continue in a step-wise fashion until the oligonucleotide has reached its desired length.

When synthesizing oligonucleotides in high-throughput, the flow path will consist of at least three elements: 1) an overhead dispense array that injects new chemicals into the synthesis vessels; 2) an x-y stage, an R-θ stage, or other type of positioning system known in the art that positions the synthesis vessels underneath the dispense array, 3) a method of removing chemicals from the synthesis vessels, for example, a downstream vacuum or an upstream pressure source, e.g. placing the synthesis vessels in a pressurized chamber and evacuating the pressure through the synthesis vessels.

The claims herein suggest improvements in all three of the above flow path elements, but primarily, these improvements will apply to element 3. Within element 3, in most cases, there exists a vacuum source and/or a pressurized chamber that uses pressure differential to move chemicals out of the synthesis vessel(s). While both methods are capable of moving chemicals or other fluids through one or more oligonucleotide synthesis vessels, both have significant shortcomings. Some examples of this include:
  a. Utilizing the downstream vacuum method, fluids will be pulled through the synthesis vessels at a rate dependent upon the quality of the vacuum source. The vacuum source must also be calibrated to create consistent flow. Poor quality or incorrect calibration of the vacuum can lead to ineffective synthesis, and potentially, an overflow of solvents.
  b. The downstream vacuum method requires a waste container that is both compatible with oligonucleotide synthesis chemistry and can withstand constant vacuum pressure. This limits options for waste collection, including the option to divert waste to a common pathway for multiple oligonucleotide synthesizers.
  c. Using upstream positive pressure resolves the issues around vacuum quality, calibration, and waste disposal, but it does not address the need for slow solvent movement through the synthesis vessel. The seal necessary for this type of fluid movement by positive pressure does not allow for timed or controlled flow of the solvent through the synthesis vessel.
  d. Gravitational flow is also prevented due to pressure downstream from the synthesis vessel, and this pressure cannot be relieved without simultaneously evacuating relatively large volumes of solvent from the synthesis vessel. As a result, the effectiveness of each solvent injection will be reduced because the solvent will be resting on top of the growing oligonucleotides until pressure is applied, at which point, the fluid will be moved quickly through the oligonucleotides and out to waste, limiting the most beneficial step of the reaction.

The apparatus facilitates improvements in oligonucleotide synthesis by resolving at least the issues noted above by utilizing an equilibrated oligonucleotide synthesis (EOS) system. It should be noted that the exemplified EOS system will use an example including a 96 well plate, but this apparatus may be expanded or scaled down to seat plates or other synthesis vessels of any orientation, though typically in configurations of 12, 48, 96, 384, or 1536.

FIGS. 1A-1E show an embodiment of an equilibrated oligonucleotide synthesis (EOS) system (100). The EOS system consists of one or multiple synthesis vessels (101), a drain block (102) with waste reservoirs (107) to collect and drain waste from the synthesis vessels (101), a method of coupling (i.e., a sealing device) (106) to operably couple synthesis vessel(s) (101) to the drain block (102) so that fluid may pass from the vessel(s) into a drain block, small exhaust or "equilibration" holes (103) drilled or otherwise penetrating into waste reservoirs (107), one or more waste tubes (104) leading from waste reservoirs (107) to one or more waste valves (108). In some embodiments the waste valves (108) may comprise solenoid valves, and a method of moving fluid through the synthesis vessel(s) (e.g. a pressurized or vacuum chamber) (105). In the exemplary embodiment, the EOS system (100) exists in a pressurized chamber, though a person of ordinary skill in the art would understand the EOS system may perform equally in a vacuum chamber, in open air with fluid movement encouraged by vacuum, or by other means of creating a pressure differential between reacting fluids and a subsequent destination (e.g., a waste container, not shown).

In the exemplary embodiment, the EOS system (100) is displayed as a cross-section view of a row of twelve synthesis vessels (101) from a 96 well plate. Each well within the 96 well plate can be assumed to contain the starting material (not shown) for oligonucleotide synthesis. The starting material may consist of, for example, controlled pore glass or a polymer resin that is held within the column via two porous filters: one above the starting material and one below. The porosity of the filter should not exceed the size of the starting material. The starting material may also be embedded and within a filter material compatible with oligonucleotide synthesis chemistry. Vessels of this description may be conventional synthesis vessels.

In an exemplary embodiment of the EOS system (100), a drain block (102) may be made from 6061 aluminum, though a skilled artisan would note that any material compatible with oligonucleotide synthesis chemistry or other fluid(s) could be used. A drain block is machined with waste reservoirs (107) of sufficient volume to collect waste from all synthesis vessels simultaneously, individually, or in groupings. A drain block is machined so that it may accept one or more synthesis vessels, or in this embodiment, a 96 well plate with each well filled with the starting material for oligonucleotide synthesis.

In an embodiment of the EOS system (100) a coupling mechanism or sealing device is employed so that fluids may pass from each synthesis vessel into a drain block. A sealing device should allow the created pressure differential, either by positive pressure or vacuum, to move fluid(s) from each synthesis vessel (101) into a drain block (102). In this example of the EOS system (100), a coupling mechanism/sealing device may be a compressed gasket disposed between the plate containing 96 synthesis vessels (101) and the drain block (102). Additionally, heating of the synthesis vessels (101) may serve to excite a reaction with the vessels. In some embodiments, the synthesis vessels (101) may be heated via insertion heaters (109) (or other heating elements know in the art) positioned near the top of the drain block (102).

In an exemplary embodiment of the EOS system (100), exhaust or "equilibration" holes (103) are drilled or otherwise penetrate into the reservoirs (107) of a drain block (102). In this example, equilibration holes (103) break through into the reservoirs (107) with a dimension of 0.381 mm (0.015") in diameter. The skilled artisan would know that holes of varying sizes can be used, and that dimensioning an equilibration hole will be of critical importance when achieving a desired flowrate. These equilibration holes would be placed so that they are above the waste-emitting end of the synthesis vessel (101) or the waste reservoir (107) entirely so as not to become contaminated with the oligonucleotide synthesis waste. In such an event, functions of the EOS system may or may not be disrupted.

The waste pathway (104) that carries waste from the waste reservoir(s) (107) of the drain block (102) should be made from an inert material and of a sufficient inner diameter to transport the used reagents to waste without significant resistance. In this embodiment, 4.78 mm (0.188") outer diameter, 3.175 mm (0.125") inner diameter FEP tubing may be used. The waste pathway (107), in this embodiment, terminates at a valve (108) (e.g., a solenoid valve) that opens to an area of lower pressure than the pressure of the contents of synthesis vessels (101). As described previously, this differential is typically created through a downstream vacuum or upstream, positive pressure source.

To optimize the reactions of oligonucleotide synthesis, the EOS system can be used to slowly move solvent through the growing oligonucleotides in at least these ways:

e. In the EOS system, a downstream waste valve(s) can be opened in small increments, typically between 0.02 and 1 second, to "pull" reagents into and saturate the growing oligonucleotides via momentary shift in pressure. This will not result in reagents being immediately sent to waste, as the vacuum created in the waste pathway will equilibrate with the outside pressure through the equilibration holes in the drain block's waste reservoir(s).

f. The EOS system will remove the gas lock in the waste pathway so that reagents saturating the growing oligonucleotides will continually move through the bed of growing oligonucleotides. The reagents flowing through the oligonucleotides and into the waste pathway will displace the pressure present in the waste pathway through the equilibration holes in the drain block's waste reservoir(s).

Figure 2A:
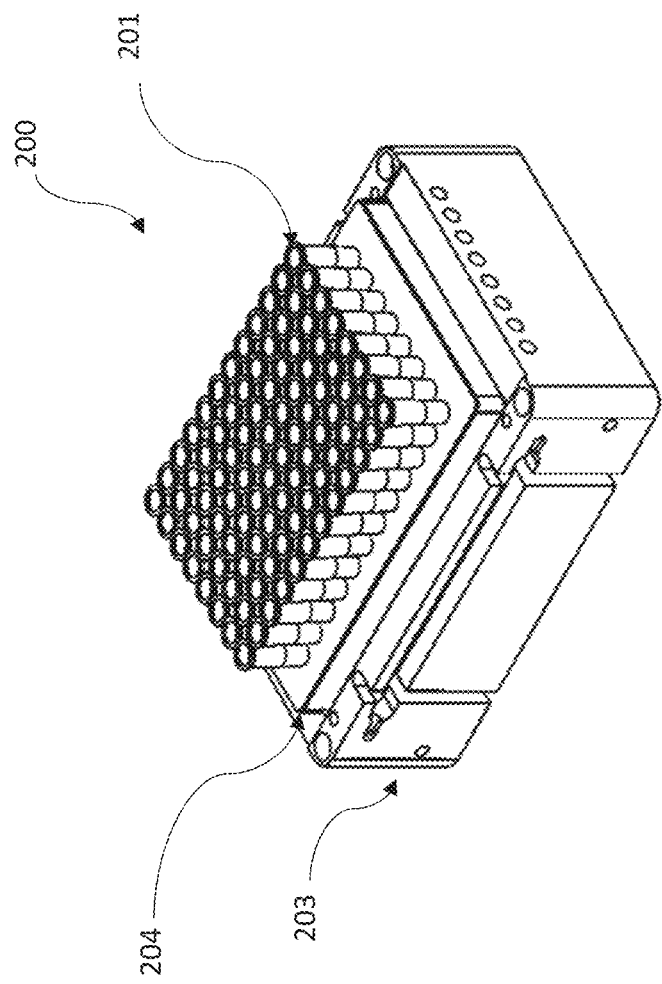
FIG. 2A shows a perspective view of a sealing device disposed between a plate with synthesis vessels and a drain block.

FIG. 2A exemplifies a synthesis assembly (200) wherein a seal may be formed between groupings of synthesis vessels (201) within the same synthesis plate (204). The synthesis assembly (200) is an improvement upon a method of coupling synthesis vessel(s) (201) to a drain block (203) that grants greater consistency to any method of moving fluid through the synthesis vessel(s) (201).

Figure 2B:
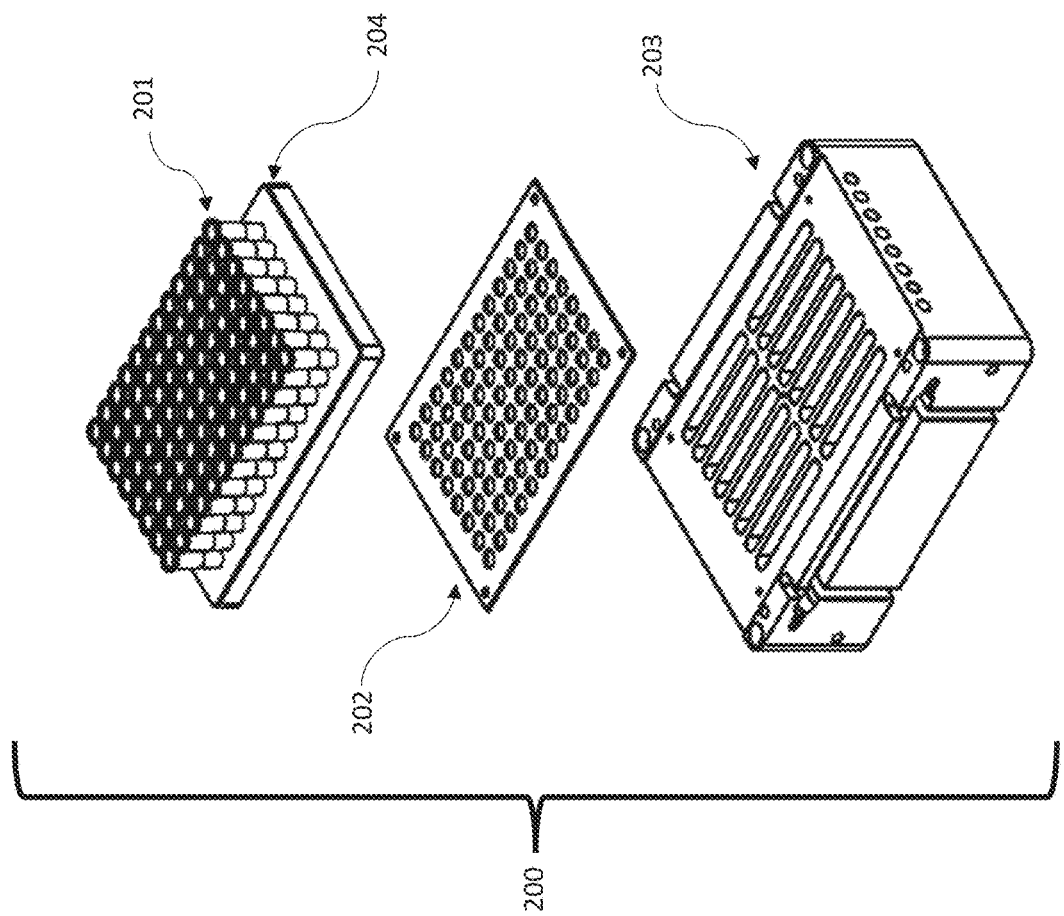
FIG. 2B shows an exploded view of FIG. 2A showing a sealing device.
Figure 2G:
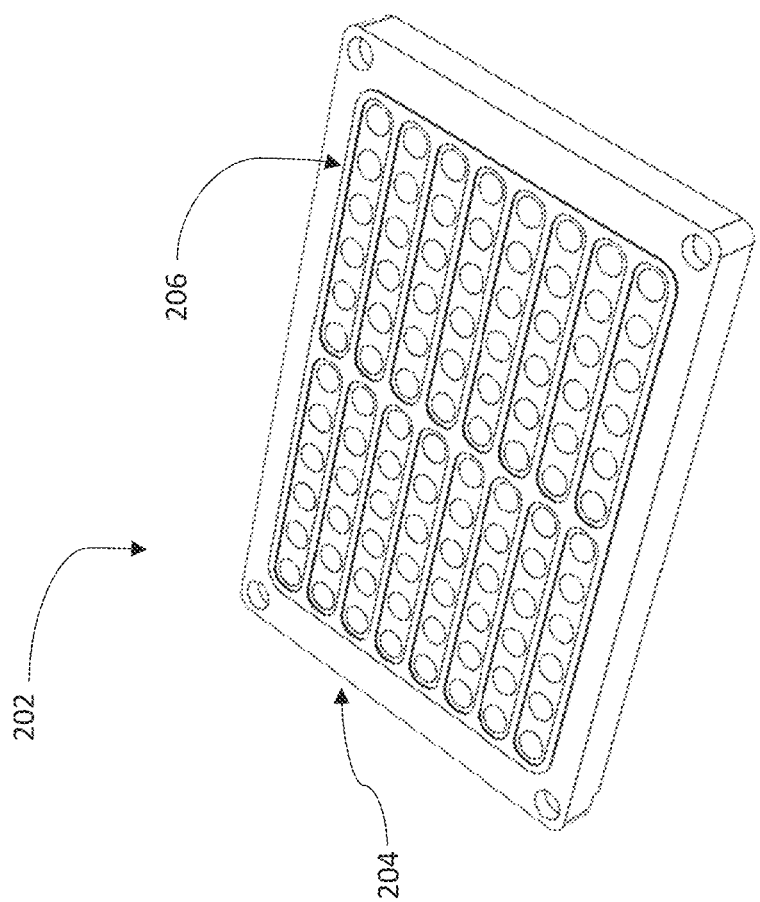
FIG. 2G is a bottom perspective view of a sealing device comprising a plate machined with an extruded groove.
Figure 2H:
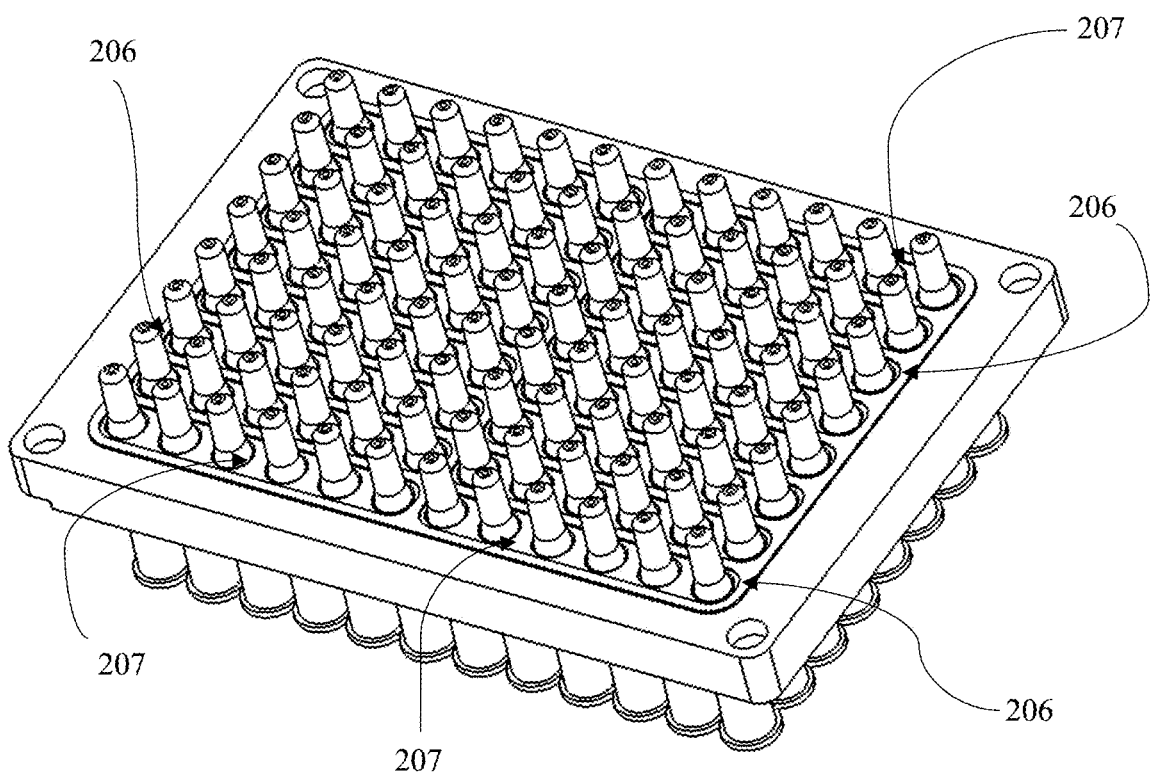
FIG. 2H is a bottom perspective view of a synthesis plate and synthesis vessels showing the extruded grooves of each of the groupings of synthesis vessels.
Figure 2I:
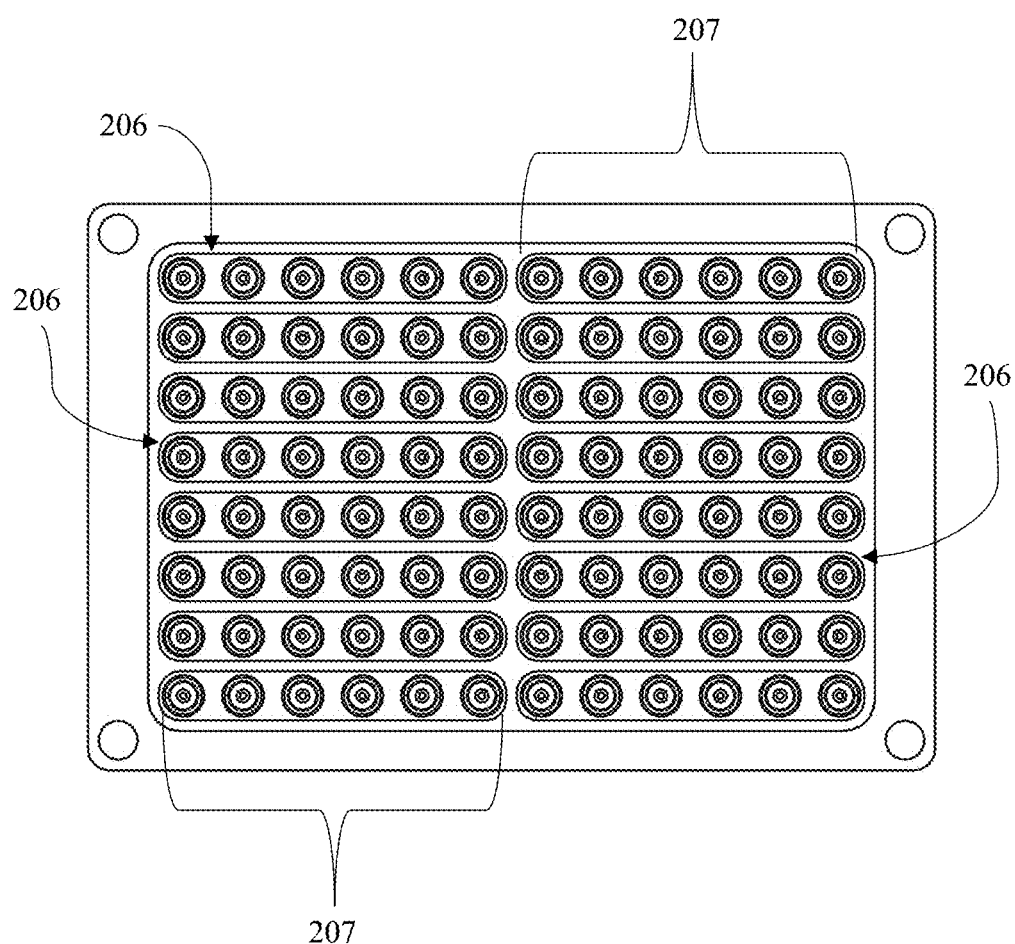
FIG. 2I is a bottom view of the synthesis plate and synthesis vessels showing the groupings of synthesis vessels and the extruded grooves.

In the exploded FIG. 2B, the elements of a synthesis assembly (200) are deconstructed. The elements of the synthesis assembly are: 1) a plate (204) holding one or many synthesis vessels (201); 2) a sealing device (i.e., a gasket) (202) cut to allow flow-through from the synthesis vessels; 3) a drain block (203) containing reservoirs (not shown) to collect and drain waste from the synthesis vessel(s) (201).

A plate (204) of the synthesis assembly (200) is exemplified in FIGS. 2C-2G. The plate (204) may be machined or otherwise manufactured with these features: 1) a sufficient amount of holes (205) to accommodate a desired amount of synthesis vessels (e.g., synthesis vessels 201 of FIG. 2B); 2) each hole of a sufficient diameter to form a seal with a respective synthesis vessel; 3) a protruding or recessed groove (206) on a sealing surface that corresponds to a preferred location of a seal on a drain block (e.g., drain block 203 of FIG. 2B). Such a design allows for multiple EOS pathways to be created within a contiguous drain block for one or many synthesis vessels, one or many synthesis plates, or groupings and combinations of each both together and individually.

The gasket (202) of the synthesis assembly (200) shown in FIGS. 2A & 2B may be made from a material compatible with the solvents being delivered to the synthesis vessel(s) (201) and of a sufficient durometer to form a seal between the plate (204) and the drain block (203). In an embodiment the gasket is made from FFKM, is 1 mm (0.04") thick and has a durometer of 70A.

Figure 2J:
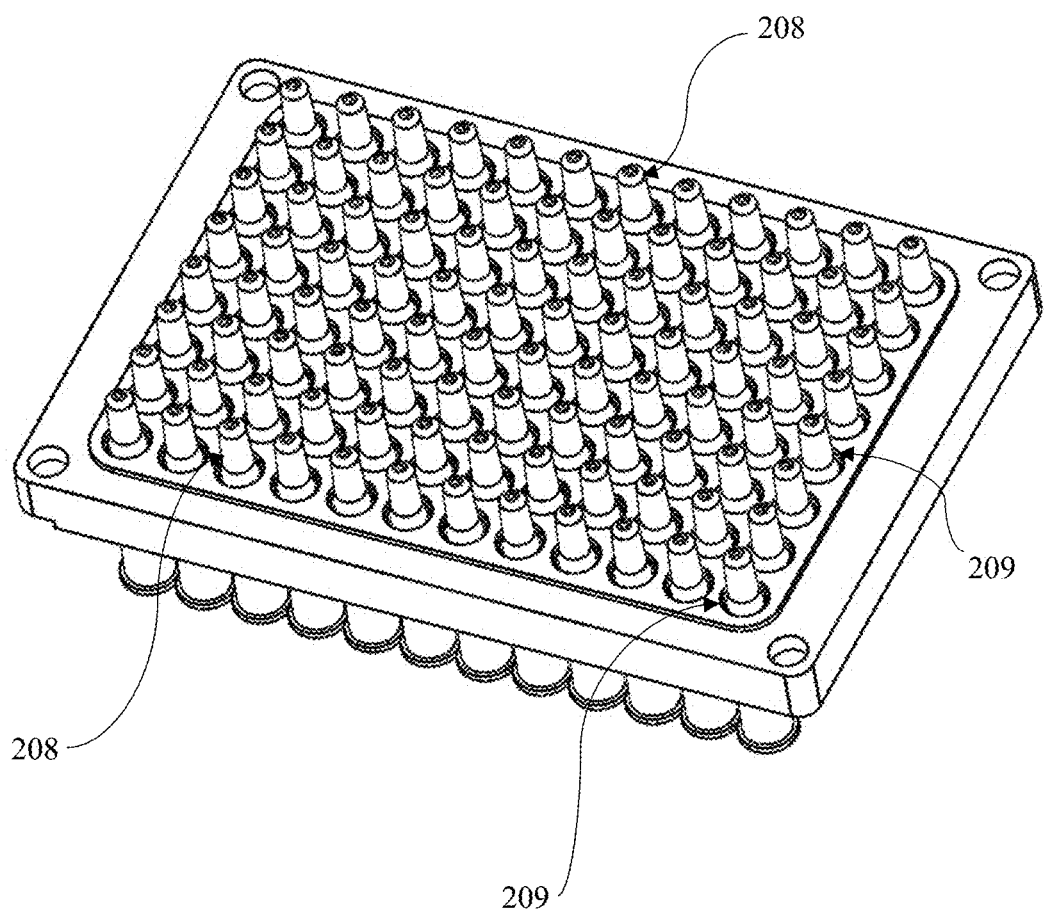
FIG. 2J is a bottom perspective view of a synthesis plate and synthesis vessels where the extruded grooves are disposed between each of the synthesis vessels.

In the embodiment of FIGS. 2E-2*i*, each of the groupings of synthesis vessels (207) comprise six synthesis vessels (e.g. syntheses vessels 201) with extruded grooves (206) surrounding each of the groupings. In the alternative embodiment of FIG. 2J, the extruded grooves (209) are disposed between each of synthesis vessels (208).

Figure 3A:
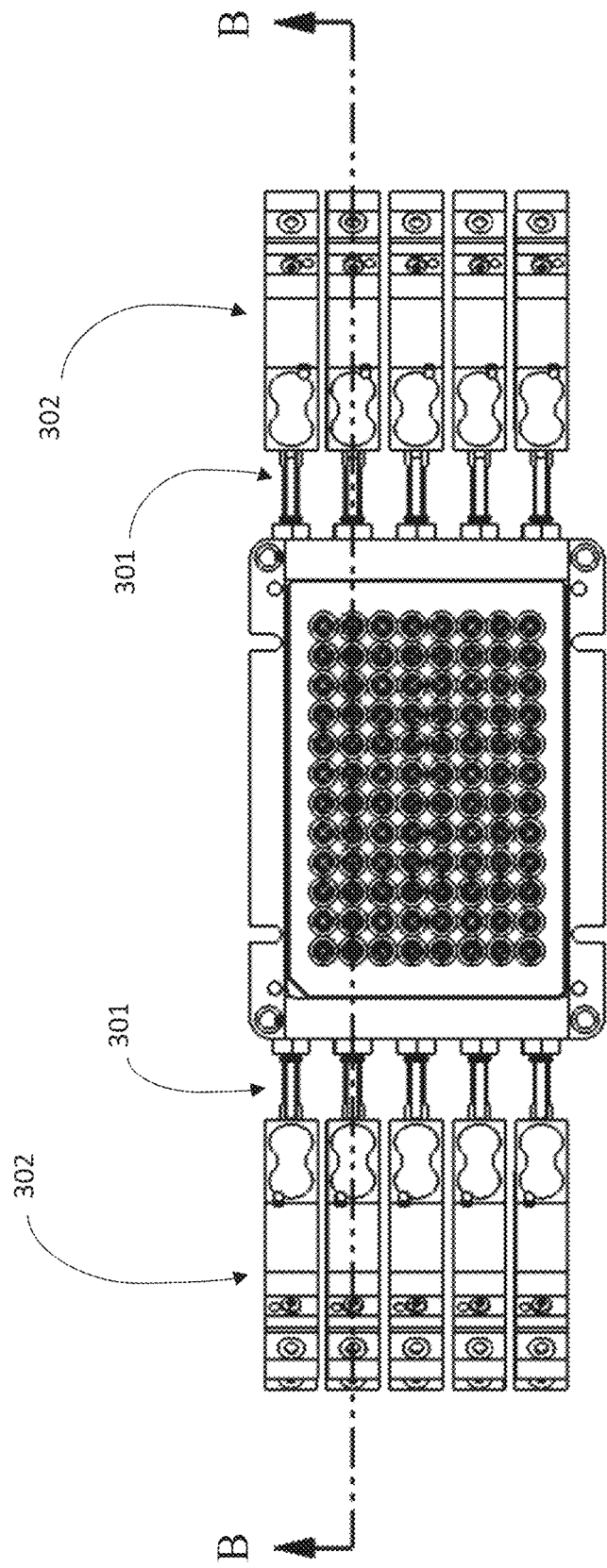
FIG. 3A shows a top view of an embodiment of the EOS system wherein exhaust or "equilibration" holes are coupled to solenoid valves.
Figure 3B:
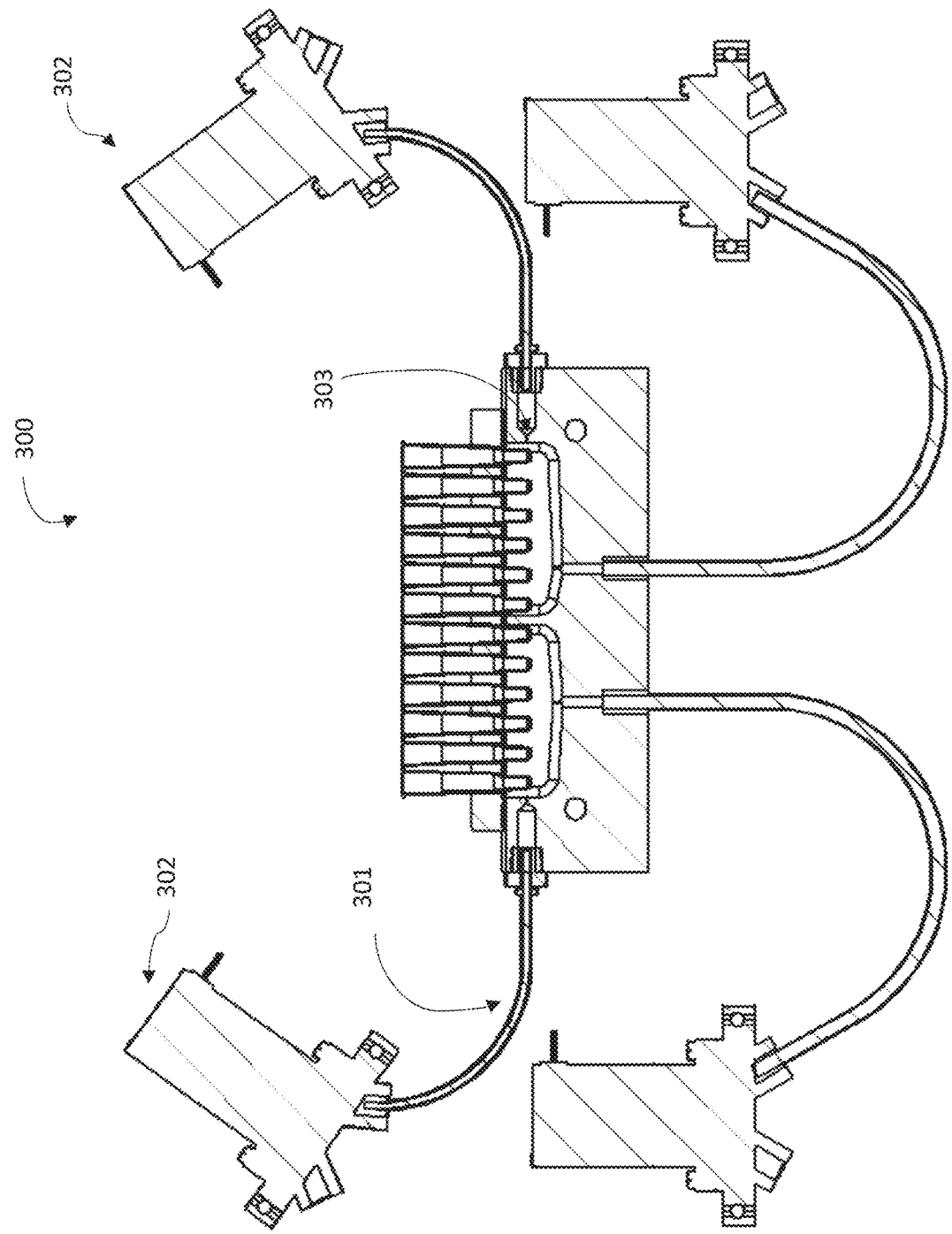
FIG. 3B shows a cross-sectional view of the EOS system of FIG. 3A

In the exemplary embodiment of an EOS system 300 of FIGS. 3A-3B, a valve (302) can be placed between the "equilibration" holes (303) and the surrounding pressure of the EOS system (300). In some embodiments, the valve (302) may comprise either a solenoid valve or flow control valve. The equilibration holes (303) may be coupled to the valve (302) with fluidic tubes (301). In embodiments having a solenoid valve, and when the solenoid valve is in the closed position, such a coupling may prevent the equilibration created by the EOS system. A possibility of this configuration is an allowance of a gas "lock", or unrelieved pressure, underneath the synthesis vessels. This may be beneficial in some instances where prevention of gravitational flow is desired.

In other cases, further control over the rate of flow from the synthesis vessel can be had by replacing the solenoid valve with a flow control valve. This will alter the rate at which the waste pathway equilibrates with the pressure source, and therefore, the rate at which fluids flow from the synthesis vessels when at rest.

In another possible embodiment in which a solenoid valve is coupled to the "equilibration" hole(s) (303) of the EOS system, a greater pressure than the surrounding pressure of the synthesis vessel(s) can be introduced underneath the synthesis vessel(s). A function of the greater pressure underneath the synthesis vessel(s) could be, among other possibilities, to maintain the existing pressure underneath the synthesis vessel(s), maintain a fluid(s) position within one or multiple synthesis vessel(s), and raise a fluid(s) position within one or multiple synthesis vessel(s).

In another embodiment, exemplified in FIGS. 4A-4F, the EOS system (400) can be configured to fit multiple synthesis vessels (403) within the same pressure system. In cases where, for example, synthesis vessels (403) ranging in volume are required, a drain block (401) can be machined to couple with one or multiple sealing block(s) (402). Each sealing block, coupled to a drain block (401), would comprise a complete EOS system, complete with one or more synthesis vessels (403), one or more sealing mechanisms (see e.g., sealing mechanism 404 of FIG. 4B), one or more equilibration holes (408), and a waste outlet coupled with a downstream solenoid.

In the exemplified embodiment of FIGS. 4A-4F, a drain block (401) consists of one or more machined plates that contain, on a surface, an O-ring groove (406) for each sealing block (402). It should be noted that the term "machined plates" should not be misconstrued with "synthesis plates". Machined plates, in this description, refer to plates that comprise a drain block. Synthesis plates, in this description, refer to microtiter plates which facilitate the reactions of oligonucleotide synthesis, and frequently, contain the starting material for oligonucleotide synthesis.

Figure 4A:
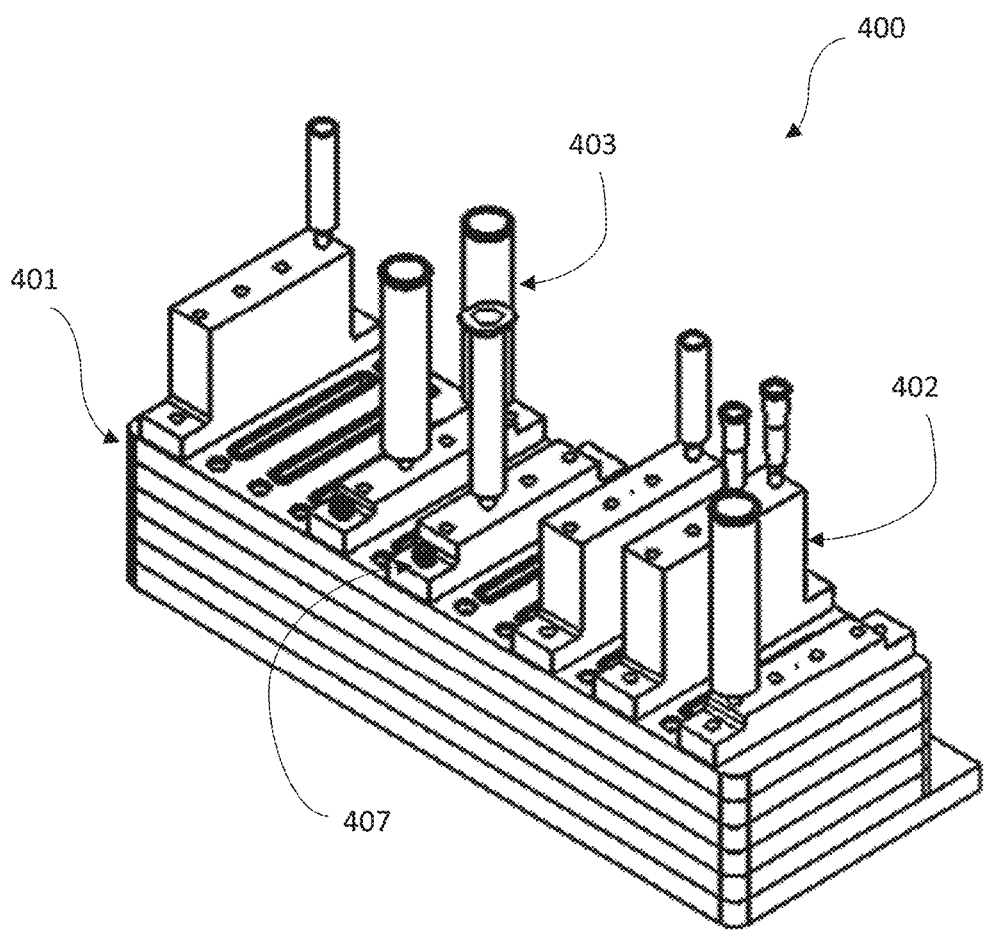
FIG. 4A shows a perspective view of an embodiment of the EOS system wherein multiple flow paths accept a sealing element or block containing an exhaust or "equilibration" hole.
Figure 4B:
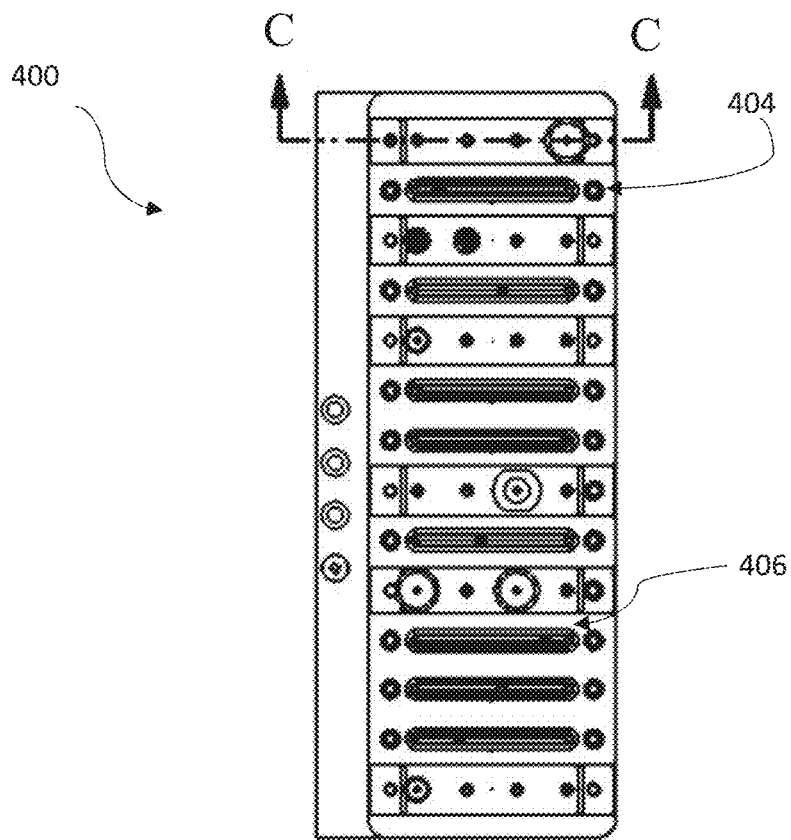
FIG. 4B is a top view of the EOS system of FIG. 4A.
Figure 4C:
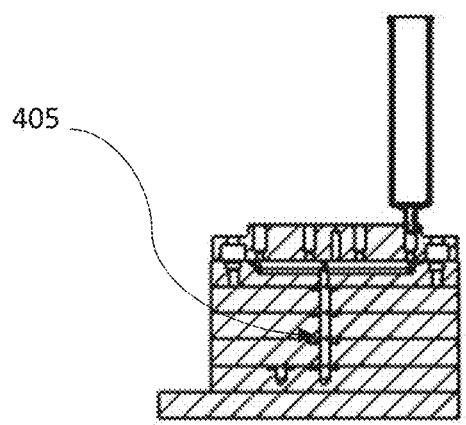
FIG. 4C is a cross-sectional view of the embodiment of the EOS system of FIGS. 4A and 4B.

In the embodiment, FIGS. 4A-4C, the drain block (401) is comprised of six machined plates joined together by conventional fasteners. However, the number of machined plates joined together may vary from two plates to twelve plates or more, depending on the application and the length and width of the drain block. The top-most machined plate functions to form a seal with one or more sealing block(s) (402) and pass fluid to lower, machined plates. Lower, machined plates contain a waste path (405) that passes collected fluid to a final destination, in this embodiment, a waste tube (e.g., an FEP tube; see e.g., waste tube 104 of FIG. 1B) coupled to a waste valve (see e.g., waste valve 108 of FIG. 1B). The bottom machined plate aligns and couples the above machined plates with a base, an x-y stage, an R-θ stage, or other type of positioning system (not shown).

Each sealing block (402) may contain a method of applying uniform force to an O-ring (406). In this embodiment, force is applied by threading a pair of captive screws (407) held within a sealing block into a top-most plate of a drain block (401) so that proper alignment and force with an O-ring (406) is achieved. The sealing block (402) may also contain an exhaust or "equilibration" hole (408; see FIG. 4F).

Once a sealing block (402) and a drain block (401) are coupled together so that fluids may be passed from one through to the other, and a negative pressure differential is established downstream of the waste valve at the end of the waste path (405), the EOS system has been created. More sealing blocks (402) may be added until a desired number of synthesis vessels is reached. Furthermore, a skilled artisan would understand a drain block (401) and a sealing block (402) could exist in various dimensions sufficient to accommodate one or multiple synthesis vessels of varying sizes so long as the critical elements of the embodiment of the EOS system 400 (i.e., one or more synthesis vessels, a sealing block, an O-ring, a drain block, a waste path and a waste valve) are present.

Figure 5A:
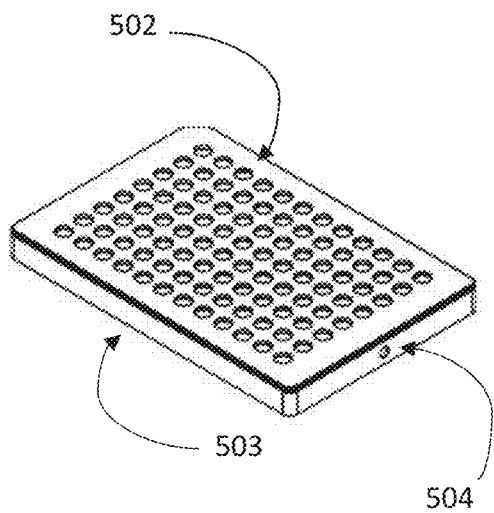
FIG. 5A is a perspective view of a sealing device according to an embodiment of the invention.
Figure 5B:
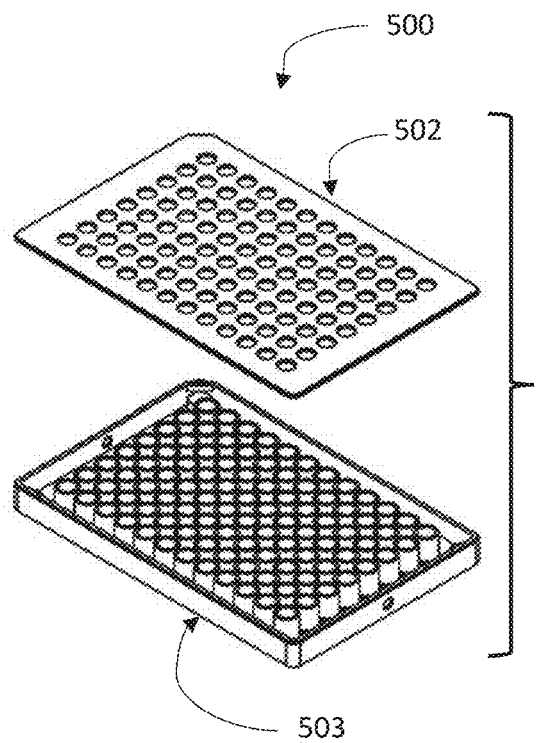
FIG. 5B is an exploded view of the sealing device of FIG. 5A.
Figure 6:
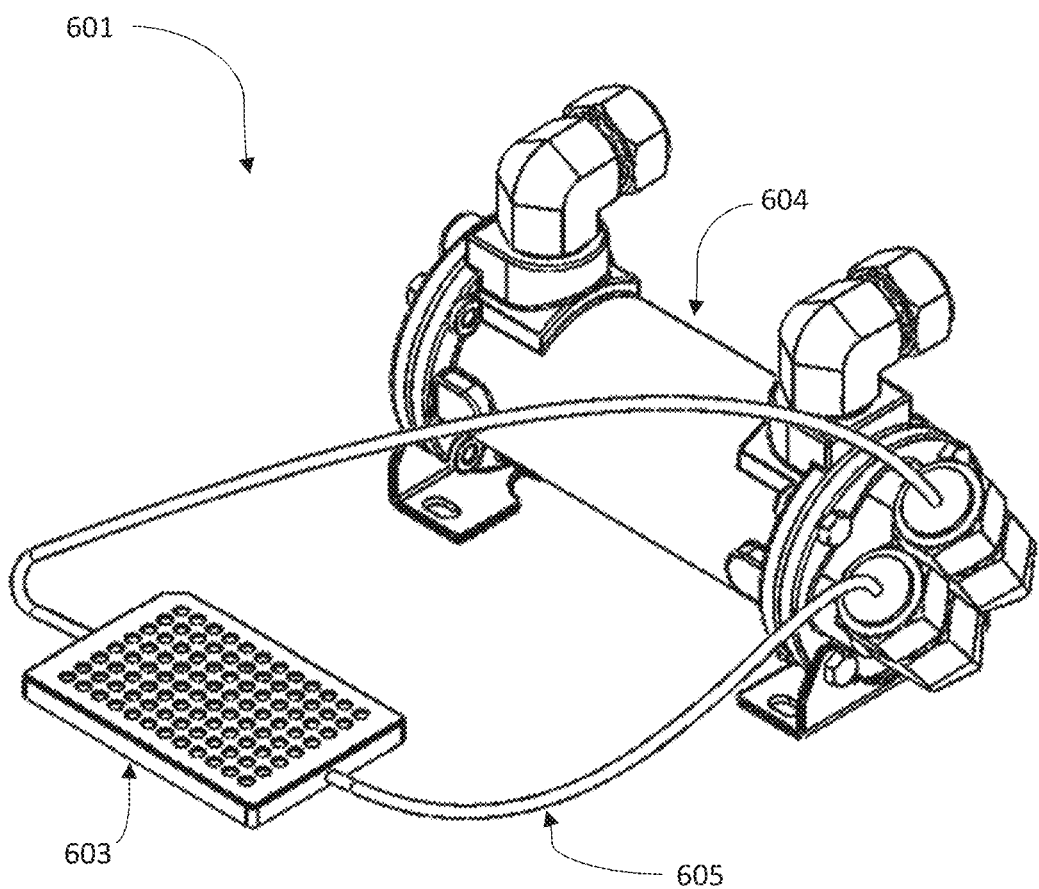
FIG. 6 is a perspective view of a sealing device further comprising a heating element.

The EOS system can be implemented in conjunction with other concepts and inventions designed to increase the overall yield of synthesis. In the embodiment of FIGS. 5A-5B, a sealing device (500) of an EOS system comprises a fluid plate (503) and a sealing plate (502). The fluid plate (503) may be machined or otherwise manufactured with coupling holes (504) so that fluidic tubing (not shown, see e.g., fluidic tubing 605 of FIG. 6) may be coupled to the sealing plate (503) and heated water or other fluids may pass through, thereby heating each synthesis vessel. Depending on the synthesis materials utilized, heating of the synthesis vessels may serve to excite a reaction with the vessels. FIG. 6 incorporates a shell and tube heat exchanger (604) for heating the fluid plate (603). Other heating and/or cooling elements known in the art may be incorporated, such as insertion heaters (see e.g., insertion heater 109 of FIG. 1E), heating strips, Peltier modules, etc.

Using the unique apparatus along with the additional design elements and methods described herein, the end user is left with a machine far superior to those existing in today's oligonucleotide synthesis market. The machine allows plate-based synthesis to compete with conventional "column-based" synthesis by shortening cycle times and reducing waste, while creating smaller quantities of oligonucleotides in higher yields and wider varieties at no additional cost.

Exemplary Embodiments of the Disclosed Subject Matter

Example 1: In various embodiments, the disclosed subject matter includes an apparatus used in oligonucleotide synthesis. The apparatus includes a one or multiple synthesis vessels, a drain block with reservoirs to collect and drain waste from the synthesis vessels, a method of coupling synthesis vessel(s) so that fluid may pass from the vessel(s) into a drain block, small exhaust or "equilibration" holes drilled into waste collection reservoirs, one or multiple waste paths leading from waste reservoirs to a waste valve, and a method of moving fluid through the synthesis vessel(s).

Example 2: The apparatus of Example 1, wherein the apparatus is configured to drain multiple or single synthesis vessels, known in the art as synthesis "columns".

Example 3: The apparatus of Example 1 or Example 2, wherein the apparatus is configured to drain multiple or single microtiter plates.

Example 4: The apparatus of any one of the preceding Examples, wherein the exhaust or "equilibration" holes allow for pressure underneath the synthesis columns to become equilibrated with a chosen pressure target ranging between 0-100 psi.

Example 5: The apparatus of any one of the preceding Examples, wherein the exhaust or "equilibration" holes may be used to introduce pressure underneath the synthesis columns as a means of controlling fluid flow during oligonucleotide synthesis.

Example 6: The apparatus of any one of the preceding Examples, wherein the exhaust or "equilibration" holes may be used to introduce vacuum underneath the synthesis columns as a means of controlling fluid flow during oligonucleotide synthesis.

Example 7: The apparatus of any one of the preceding Examples, wherein the exhaust or "equilibration" holes may be coupled to a flow control valve to adjust the rate of equilibration underneath the synthesis vessel(s).

Example 8: The apparatus of any one of the preceding Examples, wherein a sealing or coupling device is machined with an extruded groove that forms a seal between the opposing drain block's waste reservoirs.

Example 9: The apparatus of any one of the preceding Examples, wherein a sealing or coupling device is machined with O-rings that forms a seal between the opposing drain block's waste reservoirs.

Example 10: The apparatus of any one of the preceding Examples, wherein a sealing or coupling device is machined to seal against with O-rings that that are machined around the drain block's waste reservoirs.

Example 11: In various embodiments, the disclosed subject matter includes an apparatus used in oligonucleotide synthesis. The apparatus includes a drain block that consists of one or more machined plates that contain, on a surface, an O-ring groove for individual sealing blocks.

Example 12: The apparatus of Example 11, wherein the sealing blocks of the apparatus apply uniform force to an O-ring.

Example 13: The apparatus of Example 11 or Example 12, wherein force is applied by threading a pair of captive screws, held within a sealing block, into a top-most plate of a drain block.

Example 14: The apparatus of Example 11 or Example 12, wherein the apparatus contains the features of Example 1.

Example 15: The apparatus of Example 11 or Example 12, wherein the apparatus is configured to accept synthesis columns.

Example 16: The apparatus of Example 11 or Example 12, wherein the apparatus is configured to accept syringe bodies.

Example 17: The apparatus of Example 11 or Example 12, wherein the apparatus is configured to accept microtiter plates.

Example 18: The apparatus of Example 8, wherein the apparatus is configured to have its temperature increased or decreased by water.

Example 18: The apparatus of Example 8, wherein the apparatus is configured with a heating rod or Peltier.

Example 19: The apparatus of any one of the preceding Examples, wherein the apparatus is configured to agitate the reacting material for oligonucleotide synthesis.

Example 20. An apparatus comprising: a plurality of synthesis vessels, each of the plurality of synthesis vessels having a waste emitting end; a drain block located below and operably coupled to the plurality of synthesis vessels; a sealing device disposed between the plurality of synthesis vessels and the drain block; one or more waste collection reservoirs located inside of the drain block; one or more equilibration holes, each equilibration hole penetrating an exterior of the drain block and one of the one or more waste collection reservoirs; one or more waste tubes leading from the one or more waste collection reservoirs, each waste tube comprising a waste valve.

Example 21. The above apparatus wherein each of the one or more equilibration holes is operably coupled to a flow control valve.

Example 22. The above apparatus wherein the sealing device comprises extruded grooves disposed between groupings of the plurality of synthesis vessels.

Example 23. The above apparatus wherein the sealing device comprises extruded grooves disposed between each one of the plurality synthesis vessels.

Example 24. The above apparatus wherein the sealing device further comprises a sealing plate and a fluid plate.

Example 25. The above apparatus wherein the fluid plate comprises coupling holes.

Example 26. The above apparatus wherein the fluid plate is operably coupled to fluidic tubing via the coupling holes.

Example 27. The above apparatus wherein a heating element operably coupled to the fluidic tubing.

Example 28. An apparatus comprising: a pressurized chamber; an equilibrated oligonucleotide synthesis (EOS) system inside of the pressurized chamber, the EOS system comprising: a plurality of synthesis vessels, each of the plurality of synthesis vessels having a waste emitting end; a drain block located below and operably coupled to the plurality of synthesis vessels; a sealing device disposed between the plurality of synthesis vessels and the drain block; one or more waste collection reservoirs located inside of the drain block; one or more waste tubes leading from the one or more waste collection reservoirs, each waste tube comprising a waste valve.

Example 29. The above apparatus wherein the drain block further comprises one or more machined plates, each of the one or more machined plates comprising a set of extruded grooves.

Example 30. The above apparatus wherein the sealing device comprises a sealing plate and a fluid plate.

Example 31. The above apparatus wherein the sealing device comprises one or more sealing blocks and the top-most machined plate of the one or more machined plates is operably coupled to the one or more sealing blocks via the set of extruded grooves.

Example 32. The above apparatus wherein the one or more sealing blocks comprises one or more equilibration holes, the one or more equilibration holes located above the waste-emitting ends of the one or more synthesis vessels.

Example 33. The above apparatus wherein the fluid plate comprises coupling holes and a heating element is operably coupled to the coupling holes.

Example 34. The above apparatus wherein the heating element is a heating rod or peltier.

Example 35. An apparatus comprising a vacuum chamber; an equilibrated oligonucleotide synthesis (EOS) system inside of the vacuum chamber, the EOS system comprising: one or more synthesis vessels, each of the one or more synthesis vessels having a waste emitting end; a drain block located below and operably coupled to the one or more synthesis vessels, the drain block comprising one or more machined plates; one or more waste collection reservoirs located inside of the drain block; one or more equilibration holes, each equilibration hole penetrating an exterior of the drain block and one of the one or more waste collection reservoirs, the equilibration holes located above the waste-emitting ends of the one or more synthesis vessels; and one or more waste paths leading from the one or more waste collection reservoirs, each waste path comprising a waste valve.

Example 36. The above apparatus wherein each of the one or more machined plates further comprises a set of extruded grooves.

Example 37. The above apparatus wherein a top-most machined plate of the one or more machined plates is operably coupled to one or more sealing blocks via the set of extruded grooves and O-rings.

Example 38. The above apparatus wherein each of the one or more equilibration holes is operably coupled to a valve.

Example 39. The above apparatus wherein the valve comprises a solenoid valve or a flow control valve.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other embodiments. For example, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The Abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims.

Thus, the appended claims are hereby incorporated into the Detailed Description, with each claim standing on its own as a separate embodiment.

What is claimed is:

1. An apparatus comprising:
   four or more synthesis vessels, each of the four or more synthesis vessels having a waste emitting end;
   a synthesis plate holding the four or more synthesis vessels, the synthesis plate having a bottom surface with grooves;
   a drain block located below and operably coupled to the synthesis plate;
   a sealing device disposed between and in contact with the synthesis plate and the drain block, the sealing device having holes to allow flow of material from the four or more synthesis vessels to the drain block;
   one or more waste collection reservoirs located inside of the drain block;
   one or more equilibration holes, each of the one or more equilibration holes penetrating an exterior of the drain block and one of the one or more waste collection reservoirs, the equilibration holes located above the waste emitting end of the four or more synthesis vessels;
   one or more waste tubes, each of the one or more waste tubes operably connected to the one or more waste collection reservoirs.

2. The apparatus of claim 1, further comprising at least one flow control valve, wherein each of the one or more equilibration holes is operably coupled to a flow valve of the at least one.

3. The apparatus of claim 1, further comprising two or more groupings of synthesis vessels, each of the two or more groupings of synthesis vessels comprising two or more synthesis vessels, wherein the grooves are disposed between the two or more groupings of synthesis vessels.

4. The apparatus of claim 1, wherein the grooves are disposed around each of the four or more synthesis vessels.

5. The apparatus of claim 1, wherein the sealing device further comprises a sealing plate and a fluid plate.

6. The apparatus of claim 1, wherein the sealing device comprises coupling holes.

7. The apparatus of claim 6, further comprising fluidic tubing, wherein the sealing device is operably coupled to the fluidic tubing via the coupling holes.

8. The apparatus of claim 7, further comprising a heating element operably coupled to the fluidic tubing.

9. The apparatus of claim 1, wherein the equilibration holes are located above the waste reservoir.

10. The apparatus of claim 1, wherein the one or more waste tubes comprise a waste valve.

11. The apparatus of claim 1, further comprising a pressurized chamber surrounding the four or more synthesis vessels, the synthesis plate, the drain block and the sealing device.

12. The apparatus of claim 1, further comprising a vacuum chamber surrounding the four or more synthesis vessels, the synthesis plate, the drain block and the sealing device.

* * * * *